United States Patent
Hagan et al.

(10) Patent No.: US 7,072,776 B2
(45) Date of Patent: Jul. 4, 2006

(54) METHOD OF REGULATING RESISTANCE IN A DISCONTINUOUS TIME HOT-WIRE ANEMOMETER

(75) Inventors: Tobin D. Hagan, Dallas, TX (US); David J. Baldwin, Allen, TX (US); William E. Grose, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/985,388

(22) Filed: Nov. 9, 2004

(65) Prior Publication Data

US 2006/0100795 A1     May 11, 2006

(51) Int. Cl.
*G06F 1/00*   (2006.01)
*G01F 1/68*   (2006.01)

(52) U.S. Cl. ............... 702/47; 702/50; 73/204.15; 73/204.14

(58) Field of Classification Search ............ 702/47
See application file for complete search history.

(56) References Cited

U.S. PATENT DOCUMENTS

| | | | |
|---|---|---|---|
| 3,603,147 A * | 9/1971 | Dorman | 73/204.14 |
| 4,854,167 A * | 8/1989 | Czarnocki et al. | 73/204.19 |
| 6,763,711 B1 * | 7/2004 | Nair et al. | 73/204.15 |

* cited by examiner

*Primary Examiner*—John Barlow
*Assistant Examiner*—Jonathan Moffat
(74) *Attorney, Agent, or Firm*—William B Kempler; W. James Brady, III; Frederick J. Telecky, Jr.

(57) ABSTRACT

A system and method are provided to regulate resistance in a discontinuous time hot-wire anemometer. The solution removes supply voltage dependency on the mass airflow output signal. Operating the hot-wire anemometer using discontinuous time regulation offers lower system power, but introduces an inverse supply dependent term in the associated transfer function. This effect is removed by multiplying the output signal via a supply dependent signal.

14 Claims, 1 Drawing Sheet

METHOD OF REGULATING RESISTANCE IN A DISCONTINUOUS TIME HOT-WIRE ANEMOMETER

BACKGROUND OF THE INVENTION

1. Field of the Invention

This invention relates generally to flow sensors, and more particularly a method of regulating resistance in a discontinuous time hot-wire anemometer commonly employing a heated resistance wire to sense flow rate.

2. Description of the Prior Art

Numerous applications require measurement of air flow rates. Hot wire air flow sensors, or anemometers, for example, are commonly employed as air flow sensors in ventilators and similar equipment. The anemometer utilizes a wire resistor that forms one arm of a Wheatstone bridge circuit. The other arms of the bridge circuit contain other resistors, one or more of which may be variable. A power supply is connected across one pair of terminals of the bridge circuit and an indicator device is connected across the other pair of terminals of the bridge circuit. Energization of the bridge circuit passes a current through the wire resistor to increase its temperature and cause it to become a "hot wire." The resistance of the wire resistor is proportional to its temperature. As the flow rate increases, the wire resistor is cooled, altering its resistance. The resultant resistance imbalance in the bridge circuit, as sensed via the indictor device, is an indication of the flow rate passing the hot wire resistor.

Modern applications of anemometers such as described herein before, require lower power than that generally required in well known prior art applications. Further, these well known anemometer applications are disadvantageous in that the required supply voltage applied to the bridge circuit is dependent upon the mass airflow output signal generated via the indicator device(s).

In view of the foregoing, it is highly desirable and advantageous to provide a technique for regulating resistance in a hot-wire anemometer such that the supply voltage is not dependent upon the mass airflow output signal. It would further be advantageous and beneficial if the technique reduced the operational supply voltage requirements.

SUMMARY OF THE INVENTION

The present invention is directed to a system and method of regulating resistance in a discontinuous time hot-wire anemometer. The solution removes supply voltage dependency on the mass airflow output signal. Operating the hot-wire anemometer using discontinuous time regulation offers lower system power, but introduces an inverse supply dependent term in the associated transfer function. This effect is removed by multiplying the output signal via a supply dependent signal.

In one aspect, a system and method are implemented to provide a hot wire anemometer that requires lower power than that required using known hot wire anemometer techniques that employ continuous time regulation.

In another aspect, a system and method are implemented to remove supply voltage dependency on the mass airflow output signal associated with a hot wire anemometer.

According to one embodiment, an anemometer comprises a bridge circuit having a hot wire sensing resistor, a pair of input terminals, and a pair of output terminals, the hot wire sensing resistor operational to change its resistance in response to air flowing past it, unbalancing the bridge circuit and causing a differential signal to appear across the bridge circuit output terminals; a first differential amplifier coupled to the output terminals of the bridge circuit, the first differential amplifier configured to generate an output signal in response to the differential signal at the bridge circuit output terminals; and a switching circuit operational to cycle a supply voltage to the input terminals in response to the first differential amplifier output signal and further in response to a discontinuous time control signal, such that current does not flow continuously through the hot wire sensing resistor.

According to another embodiment, an anemometer comprises a bridge circuit having a pair of input terminals, a pair of output terminals and a hot wire sensing resistor; and a switching circuit operational to cycle supply current through the hot wire sensing resistor to regulate its resistance and to control power dissipation in the hot wire sensing resistor.

According to yet another embodiment, an anemometer comprises a bridge circuit having a pair of input terminals, a pair of output terminals and a hot wire sensing resistor; and means for discontinuous time cycling a supply current through the hot wire sensing resistor to regulate its resistance and control power dissipation in the hot wire sensing resistor.

According to still another embodiment, a method of regulating resistance in a hot-wire anemometer comprises the steps of providing a hot-wire anemometer having a hot-wire sensing resistor; and controlling current flow through the hot-wire sensing resistor in response to a discontinuous time control signal to regulate the resistance of the hot-wire sensing resistor.

According to still another embodiment, a method of regulating resistance in a hot-wire anemometer comprises controlling current flow in discontinuous time through a hot-wire sensing resistor to regulate the resistance of the hot-wire sensing resistor.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawings wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
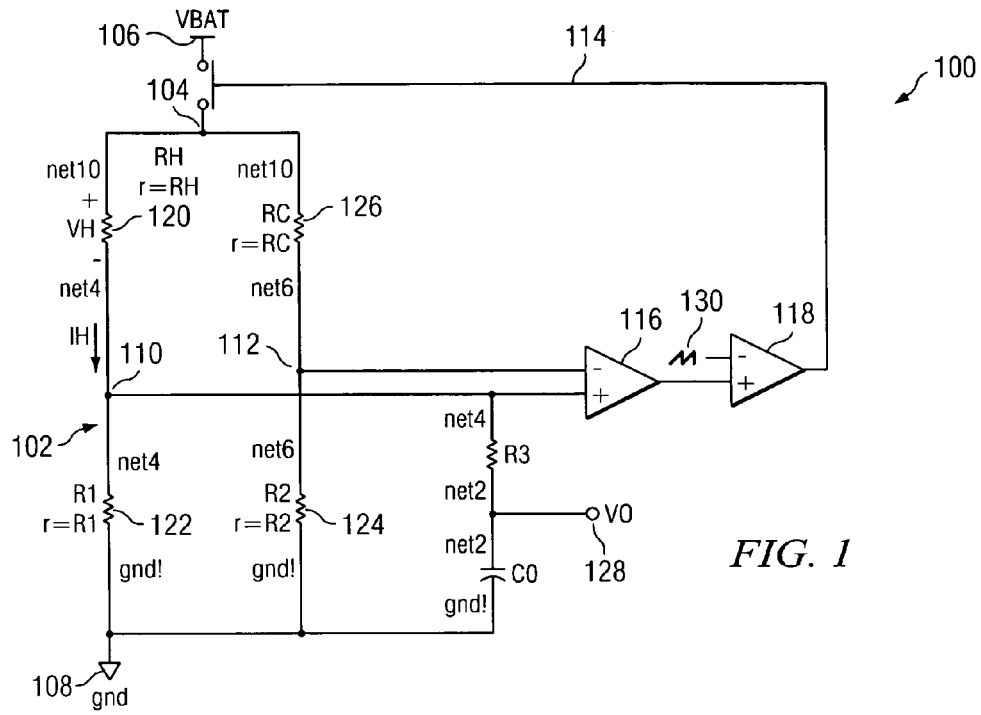
FIG. 1 is a schematic diagram illustrating a discontinuous time hot-wire anemometer according to one embodiment of the present invention.

Looking now at FIG. 1, a schematic diagram illustrates a discontinuous time hot-wire anemometer 100 according to one embodiment of the present invention. It should be noted that hot-wire anemometers known in the prior art employ continuous time regulation techniques. In contradistinction, the embodiments described herein below employ discontinuous time techniques to regulate current/voltage associated with a hot-wire anemometer. The bridge circuit 102 shown in FIG. 1 is commonly termed a Wheatstone bridge. Bridge circuit 102 has a first terminal 104 connected to a voltage source 106, a second terminal connected to a reference ground 108, and a pair of output terminals 110, 112 connected to a feedback loop 114 that can be seen to include a first operational amplifier 116 and a second operational amplifier 118. The second operational amplifier 118 is employed to implement the desired discontinuous time function such that anemometer 100 power supply requirements are reduced to desired levels.

Figure 2:
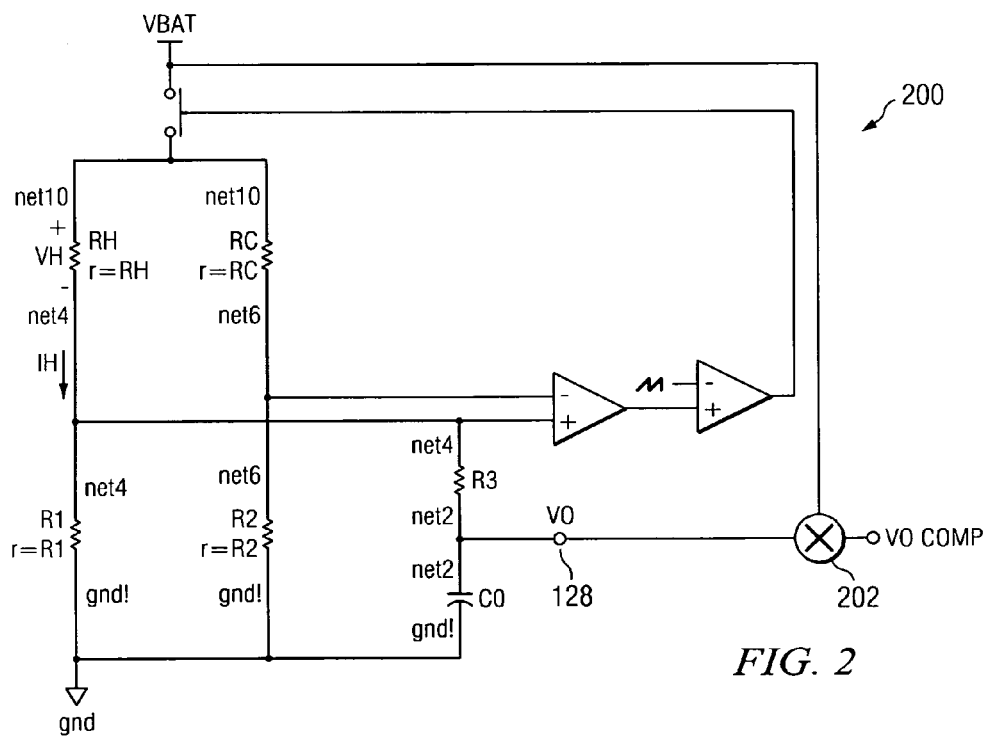
FIG. 2 is a more detailed schematic diagram illustrating the discontinuous time hot-wire anemometer shown in FIG. 1 including a multiplier to compensate the output voltage by removing the inverse supply dependent term in the system transfer function.

The discontinuous time function 130, although advantageous, introduces an undesirable inverse supply dependent term in the system transfer function. This effect is removed according to the principles discussed herein, by multiplying the output signal $V_O$ by a supply dependent signal in a manner such as depicted in FIG. 2 discussed in further detail herein below. The discontinuous time hot-wire anemometer 100 shown in FIG. 1 operates as described herein below to remove supply voltage dependency on the mass airflow output signal.

With continued reference now to FIG. 1, a variable resistor $R_H$ (e.g. platinum wire resistor) 120 forms one leg of the bridge circuit 102, while resistors $R_1$, $R_2$ and $R_C$ 122, 124, 126 respectively, form the other three legs of the bridge circuit 102. The voltage across resistor 120 is then $V_H$ and the current flowing through resistor 120 is $I_H$. The steady state power dissipated in resistor 120 is:

$$Pd = I_H^2 R_H = \frac{V_H^2}{R_H} \quad (1)$$

The following equation can be used to calculate the resistance of $R_H$:

$$R_H = R_{H0}(1 + (TC_{RH})(\theta_{ja})(P_d)) \quad (2)$$

where, $R_{H0}$=Nominal resistance of $R_H$ (ohms), $TC_{RH}$=Temperature Coefficient of $R_H$ (ppm/° C.), and $\theta_{ja}$=Thermal impedance (° C./W).

The effective current in $R_H$ can be found by applying the following equation.

$$I_H = \frac{V_{BAT}}{R_H + R_1} \quad (3)$$

Given that the system described is time discontinuous, the power dissipated in $R_H$ will not be continuous. The "DC" term in the following equation relates to the system's Duty Cycle which dictates the power dissipated in $R_H$. Substituting equations (2) and (3) into (1) results with the following $$P_d = I_H^2 R_H DC = \left(\frac{(V_{BAT})^2}{(R_H + R_1)^2}\right)[R_{H0}(1 + (TC_{RH})(\theta_{ja})(P_d))](DC) \quad (4)$$

-continued $$= \frac{(V_{BAT})^2[R_{H0} + (R_{H0})(TC_{RH})(\theta_{ja})(P_d)](DC)}{[R_1 + R_{H0} + (R_{H0})(TC_{RH})(\theta_{ja})(P_d)]^2}$$

which leads to, $$(P_d)[R_1+R_{H0}+(R_{H0})(TC_{RH})(\theta_{ja})(P_d)]^2=(V_{BAT})^2[R_{H0}+(R_{H0})(TC_{RH})(\theta_{ja})(P_d)](DC) \quad (5)$$

finally ending up with, $$\frac{(P_d)[R_1 + R_{H0} + (R_{H0})(TC_{RH})(\theta_{ja})(P_d)]^2}{[R_{H0} + (R_{H0})(TC_{RH})(\theta_{ja})(P_d)]} = (V_{BAT})^2(DC) \quad (6)$$

Assume now that $$\frac{(P_d)[R_1 + R_{H0} + (R_{H0})(TC_{RH})(\theta_{ja})(P_d)]^2}{[R_{H0} + (R_{H0})(TC_{RH})(\theta_{ja})(P_d)]} = K \quad (7)$$

at a given airflow rate. Substituting (7) into (6) results in, $$K = (V_{BAT})^2(DC), \text{ or } DC = \frac{K}{(V_{BAT})^2} \quad (8)$$

By applying voltage division to the circuit, it can be found that, $$V_O = (V_{BAT})\left(\frac{R_1}{R_1 + R_H}\right)(DC) = (V_{BAT})\left(\frac{R_1}{R_1 + R_H}\right)\left(\frac{K}{(V_{BAT})^2}\right) \quad (9)$$

which simplifies to, $$\therefore V_O = \left(\frac{R_1}{R_1 + R_H}\right)\left(\frac{K}{V_{BAT}}\right) \quad (10)$$

The discontinuous time regulation described herein above can be seen therefore to introduce an inverse supply dependent term into the system transfer function.

FIG. 2 is a more detailed schematic diagram illustrating a system 200 including the discontinuous time hot-wire anemometer shown in FIG. 1, but now also including a multiplier 202 to compensate the output voltage by removing the inverse supply dependent term in the system transfer function. This effect is removed from the discontinuous time hot-wire anemometer, as stated herein before, via multiplying the intermediate output signal $V_O$ at the output terminal 128 by a supply dependent signal via a multiplier 202. Such multiplication techniques can be implemented in numerous ways by those skilled in the multiplier circuit art, and so details of such multiplication techniques will not be discussed further herein in order to preserve brevity and augment clarity regarding the preferred embodiments described herein before.

In summary explanation, a discontinuous time regulation hot-wire anemometer architecture has been described that offers lower system power, but introduces an inverse supply dependent term into the transfer function. The inverse supply dependent term is removed by multiplying the output signal by a supply dependent signal. In this way, supply voltage dependency is removed from the mass airflow output signal.

In view of the above, it can be seen the present invention presents a significant advancement in the art of hot-wire anemometers. This invention has been described in considerable detail in order to provide those skilled in the anemometer art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. An anemometer comprising:
   a bridge circuit having a hot wire sensing resistor, a pair of input terminals, and a pair of output terminals, the hot wire sensing resistor operational to change its resistance in response to air flowing past it, unbalancing the bridge circuit and causing a differential signal to appear across the bridge circuit output terminals;
   a first differential amplifier coupled to the output terminals of the bridge circuit, the first differential amplifier configured to generate an output signal in response to the differential signal at the bridge circuit output terminals;
   a switching circuit operational to cycle a supply voltage to the input terminals in response to the first differential amplifier output signal and further in response to a discontinuous time control signal, such that current does not flow continuously through the hot wire sensing resistor;
   wherein the switching circuit comprises:
     a switching transistor;
     a second differential amplifier responsive to the first differential amplifier output signal and the discontinuous time control signal to turn the switching transistor on and off such that the supply voltage is intermittently connected to the bridge circuit;
   further comprising an intermediate output voltage circuit connected to the bridge circuit and operational to generate an anemometer output voltage $$V_O = \left(\frac{R_1}{R_1 + R_H}\right)\left(\frac{K}{V_{BAT}}\right),$$

where $V_O$ is the anemometer output voltage, $R_H$ is the hot wire sensing resistor, $R_1$ is a bridge circuit resistor in the same arm as hot wire sensing resistor $R_H$, K is constant determined at a given air flow rate, and $V_{BAT}$ is the anemometer supply voltage.

2. The anemometer according to claim 1, further comprising a multiplier configured to multiply the anemometer output voltage by a supply dependent signal such that the inverse supply voltage effect $$\left(\frac{1}{V_{BAT}}\right)$$

associated with the anemometer output voltage is negated.

3. An anemometer comprising:
   a bridge circuit having a pair of input terminals, a pair of output terminals and a hot wire sensing resistor;
   a switching circuit operational to cycle supply current through the hot wire sensing resistor to regulate its resistance and to control power dissipation in the hot wire sensing resistor;
   wherein the switching circuit comprises:
     a switching transistor;
     a first differential amplifier coupled to the bridge circuit output terminals, the first differential amplifier configured to generate an output signal in response to a differential signal at the bridge circuit output terminals;
     a second differential amplifier operational in response to the first differential amplifier output signal and further in response to a discontinuous time control signal, to turn the switching transistor on and off such that a bridge circuit supply voltage is controlled to limit the power dissipation in the hot wire sensing resistor;
   further comprising an intermediate output voltage circuit connected to the bridge circuit, the intermediate output voltage circuit operational to generate an anemometer output voltage represented by $$V_O = \left(\frac{R_1}{R_1 + R_H}\right)\left(\frac{K}{V_{BAT}}\right),$$

where $V_O$ is the anemometer output voltage, $R_H$ is the hot wire sensing resistor, $R_1$ is a bridge circuit resistor in the same arm as hot wire sensing resistor $R_H$, K is constant determined at a given air flow rate, and $V_{BAT}$ is the anemometer supply voltage.

4. The anemometer according to claim 3, further comprising a multiplier configured to multiply the anemometer output voltage by a supply dependent signal such that the inverse supply voltage effect $$\left(\frac{1}{V_{BAT}}\right)$$

associated with the anemometer output voltage is negated.

5. An anemometer comprising:
   a bridge circuit having a pair of input terminals, a pair of output terminals and a hot wire sensing resistor; and
   means for discontinuous time cycling a supply current through the hot wire sensing resistor to regulate its resistance and control power dissipation in the hot wire sensing resistor;
   further comprising means for generating an inverse supply voltage dependent anemometer output signal.

6. The anemometer according to claim 5, wherein the supply current discontinuous time cycling means comprises a switching circuit.

7. The anemometer according to claim 6, wherein the switching circuit comprises:

a switching transistor;

a first differential amplifier coupled to the bridge circuit output terminals, the first differential amplifier configured to generate an output signal in response to a differential signal at the bridge circuit output terminals; and a second differential amplifier operational in response to the first differential amplifier output signal and further in response to a discontinuous time control signal, to turn the switching transistor on and off such that a bridge circuit supply voltage connected to the bridge circuit input terminals is controlled to limit the power dissipation in the hot wire sensing resistor.

8. The anemometer according to claim 5, further comprising means for multiplying the inverse supply voltage anemometer output signal by a supply dependent signal to generate an anemometer output voltage that is devoid of inverse supply voltage effects.

9. The anemometer according to claim 5, further comprising means for generating an anemometer output voltage signal represented by $$V_O = \left(\frac{R_1}{R_1 + R_H}\right)\left(\frac{K}{V_{BAT}}\right),$$

where $V_O$ is the anemometer output voltage, $R_H$ is the hot wire sensing resistor, $R_1$ is a bridge circuit resistor in the same arm as hot wire sensing resistor $R_H$, K is constant determined at a given air flow rate, and $V_{BAT}$ is the bridge circuit supply voltage.

10. The anemometer according to claim 9, further comprising means for multiplying the anemometer output voltage by a supply dependent signal such that the inverse supply voltage effect $$\left(\frac{1}{V_{BAT}}\right)$$

associated with the anemometer output voltage is negated.

11. A method of regulating resistance in a hot-wire anemometer, the method comprising the steps of:

providing a hot-wire anemometer having a hot-wire sensing resistor;

controlling current flow through the hot-wire sensing resistor in response to a discontinuous time control signal to regulate the resistance of the hot-wire sensing resistor;

further comprising the step of controlling the current flow through the hot-wire sensing resistor in response to a hot-wire anemometer output voltage represented as:

$$V_O = \left(\frac{R_1}{R_1 + R_H}\right)\left(\frac{K}{V_{BAT}}\right),$$

where $V_O$ is the anemometer output voltage, $R_H$ is the hot wire sensing resistor, $R_1$ is a bridge circuit resistor in the same arm as hot wire sensing resistor $R_H$, K is constant determined at a given air flow rate, and $V_{BAT}$ is the anemometer supply voltage.

12. The method according to claim 11, further comprising the step of multiplying the hot-wire anemometer output voltage via a supply dependent signal such that the inverse supply voltage effect $$\left(\frac{1}{V_{BAT}}\right)$$

associated with the anemometer output voltage is negated.

13. A method of regulating resistance in a hot-wire anemometer, the method comprising controlling current flow in discontinuous time through a hot-wire sensing resistor to regulate the resistance of the hot-wire sensing resistor, wherein controlling current flow in discontinuous time through a hot-wire sensing resistor is responsive to a hot-wire anemometer output voltage represented as:

$$V_O = \left(\frac{R_1}{R_1 + R_H}\right)\left(\frac{K}{V_{BAT}}\right),$$

where $V_O$ is the anemometer output voltage, $R_H$ is the hot wire sensing resistor, $R_1$ is a anemometer bridge circuit resistor in the same arm as hot wire sensing resistor $R_H$, K is constant determined at a given air flow rate, and $V_{BAT}$ is a anemometer supply voltage.

14. The method according to claim 13, further comprising the step of multiplying the hot-wire anemometer output voltage via a supply dependent signal to generate a compensated anemometer output voltage devoid of inverse supply voltage effects.

* * * * *